US 6,725,174 B2

(12) United States Patent
Bouts et al.

(10) Patent No.: US 6,725,174 B2
(45) Date of Patent: Apr. 20, 2004

(54) EDGE-PRESERVING ENHANCEMENT OF SEISMIC IMAGES BY NONLINEAR ANISOTROPIC DIFFUSION

(75) Inventors: Erik Bouts, Rijswijk (NL); Gijsbert Christiaan Fehmers, Rijswijk (NL); Stiliyan Nikolov Kalitzin, Bunnik (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/344,052
(22) PCT Filed: Aug. 9, 2001
(86) PCT No.: PCT/EP01/09277
§ 371 (c)(1),
(2), (4) Date: Feb. 7, 2003
(87) PCT Pub. No.: WO02/13139
PCT Pub. Date: Feb. 14, 2002

(65) Prior Publication Data
US 2003/0179907 A1 Sep. 25, 2003

(30) Foreign Application Priority Data
Aug. 9, 2000 (EP) ............................................. 00306780

(51) Int. Cl.⁷ ................................................. G01V 1/48
(52) U.S. Cl. ........................... 702/181; 702/14; 703/10
(58) Field of Search .......................... 702/192, 14, 181; 382/266; 166/249

(56) References Cited

U.S. PATENT DOCUMENTS 6,327,537 B1 * 12/2001 Ikelle ............................ 702/14
2002/0195246 A1 * 12/2002 Davidson .................... 166/249

OTHER PUBLICATIONS

J. Weickert, "Coherence–Enhancing Diffusion Filtering", Image Sciences Institute, University Hospital Utrecht, The Netherlands, 1999 Kluwer Academic Publishers, pp. 111–127.

S. Guillon, et al, "Adaptive nonlinear filters for 2D and 3D image enhancement", Signal Processing 67, 1998, pp. 237–254.

J Weickert 'Anisotropic diffusion in image processing' Jan. 1996, pp. 10, 41–44.

* cited by examiner

Primary Examiner—John Barlow
Assistant Examiner—Victor J. Taylor

(57) ABSTRACT

A method for preserving edges in an image data set utilizing a modified anisotropic diffusion technique which can be applied multiple times to the image data to improve edge definition. The modified anisotropic diffusion technique may be applied to a filtered data set as well.

7 Claims, 4 Drawing Sheets

EDGE-PRESERVING ENHANCEMENT OF SEISMIC IMAGES BY NONLINEAR ANISOTROPIC DIFFUSION

PRIORITY CLAIM

The present application claims priority on European Patent Application 00306780.8, filed on Aug. 9, 2000.

BACKGROUND OF THE INVENTION

The present invention relates to a method of processing an image, for example a seismic image, applying a diffusion process. Such methods are known, see for example the thesis J. Weickert, 'Anisotropic Diffusion in Image Processing', Ph.D. Thesis, University of Kaiserslautem, Germany, January 1996, pages 41–44.

Known is a diffusion method that comprises the steps of
- (a) obtaining an n-dimensional initial image data set, wherein each element u(m=0) of the data set is the initial image intensity of a point of the image, and wherein n=2 or n=3;
- (b) calculating for each point the partial derivatives of u(m) in n directions to obtain n derivative data sets of the partial derivatives $u_{xi}$;
- (c) calculating for each point a symmetric n×n structural matrix S, wherein the elements $s_{pq}$ equal $u_{xp} \cdot u_{xq}$;
- (d) calculating for each point an n×n diffusion matrix D, wherein the elements $d_{ij}$ are a function of the elements $s_{pq}$;
- (e) calculating for each point u(m+1) from u(m) using the following equation u(m+1)=u(m)+div(Dgrad(u(m))); and
- (f) repeating steps (b) through (e) M times to obtain the processed image.

Unless otherwise specified, the following holds throughout the specification and the claims:

$$i, j, p, q = 1, \ldots, n;$$

$$u_{xi} = \partial u / \partial x_i.$$

An element of the image data set is also referred to as a point of the image.

In the known method an initial image is processed to obtain successive images, wherein each image is obtained from the previous one by a diffusion process. The diffusion method can as well be described by the $$\text{diffusion equation } \frac{\partial u}{\partial t} = div(D \cdot \nabla u).$$

There are four types of diffusion methods. At first there is the isotropic diffusion in which the diffusivity D is a scalar and the anisotropic diffusion in which D is a matrix. Then for each of these two types, the diffusion can be linear, in which D is not a function of u or the diffusion can be non linear in which D is a function of u.

This method can as well be applied to processing a seismic image, in that case the image intensity is the amplitude of the seismic signal.

An advantage of the diffusion method is that noise is suppressed. A further advantage, which is particularly relevant to processing a seismic image is that after a few cycles the geological structure is highlighted more clearly. However, a problem with this method is preserving edges.

Edge preservation is of great interest in the interpretation of seismic images, which play an important role in the study of underground formations, and in particular in the study of underground formations that contain hydrocarbons. Moreover there is a great interest in edge preserving techniques, which allow highlighting of faults while removing noise from the seismic data.

SUMMARY OF THE INVENTION

For edge preservation in combination with isotropic diffusion processing is proposed a method based on the Perona-Malik model (see the thesis of Weickert, page 10) of which the diffusion equation is $$\frac{\partial u}{\partial t} = div(g(|\nabla u|^2) \nabla u),$$

wherein the non-linear diffusivity is $g(|\nabla u|^2) = (1 + |\nabla u|^2 / \lambda^2)^{-1}$, the scalar $\lambda$ being a pre-determined edge preservation parameter.

Applicant proposes a simple addition to the known method that has proved to be an effective way of preserving edges while capable of removing noise. Moreover Applicant proposes such a method that is applicable to anisotropic diffusion.

To this end the method of processing an image according to the present invention comprises the steps of
- (a) obtaining an n-dimensional initial image data set, wherein each element u(m=0) of the data set is the initial image intensity of a point of the image, and wherein n=2 or n=3;
- (b) calculating for each point the partial derivatives of u(m) in n directions to obtain n derivative data sets of the partial derivatives $u_{xi}$;
- (c) calculating for each point a symmetric n×n structural matrix S, wherein the elements $s_{pq}$ equal $u_{xp} \cdot u_{xq}$;
- (d) calculating for each point an n×n diffusion matrix D, wherein the elements $d_{ij}$ are a function of the elements $s_{pq}$;
- (e) calculating for each point u(m+1) from u(m) using the following equation u(m+1)=u(m)+c.div($\epsilon$.Dgrad(u(m))), wherein c is a predetermined constant, $0 \leq c \leq 1$, and wherein $\epsilon$ is a scalar, $0 \leq \epsilon \leq 1$, wherein $\epsilon$ is close to zero when near an edge and close to 1 when far away from an edge; and
- (f) repeating steps (b) through (e) M times to obtain the processed image.

In this way edge preservation is introduced in anisotropic, non-linear diffusion.

Suitably step (c) comprises calculating for each point a symmetric n×n structural precursor matrix $S^0$, wherein the elements $s^0_{pq}$ equal $u_{xp} \cdot u_{xq}$; creating (½)n(n+1) data sets, wherein the elements of the first data set are $s^0_{11}$ pertaining to each point, the elements of the second data set are $s^0_{12}$ and so on; and filtering each of these data sets by convolution with a suitable kernel to obtain the elements $s_{pq}$ of the n×n structural matrix S.

Alternatively step (c) comprises filtering for each point the partial derivatives $u_{xi}$ by convolution with a suitable kernel to obtain regularized partial derivatives $u^r_{xi}$; calculating for each point a symmetric n×n structural precursor matrix $S^0$, wherein the elements $s^0_{pq}$ equal $u^r_{xp} \cdot u^r_{xq}$; creating (½)n(n+1) data sets, wherein the elements of the first data set are $s^0_{11}$ pertaining to each point, the elements of the second data set are $s^0_{12}$ and so on; and filtering each of these data sets by convolution with a suitable kernel to obtain the elements $s_{pq}$ of the n×n structural matrix S.

The above described alternatives for step (c), wherein a precursor matrix is calculated allows defining the edge preservation parameter as follows: $\epsilon = \text{trace}(S^0 S)/(\text{trace}(S^0) \cdot \text{trace}(S))$. In this way the edge preservation parameter is calculated for each point.

The present invention also relates to a method of processing an image in order to display the edge preservation parameter. This method comprises the steps of (a) obtaining an n-dimensional initial image data set, wherein each element u(m0) of the data set is the initial image intensity of a point of the image, and wherein n=2 or n=3;

(b) calculating for each point the partial derivatives of u(m) in n directions to obtain n derivative data sets of the partial derivatives $u_{xi}$;

(c) calculating for each point a symmetric n×n structural matrix $S^0$, wherein the elements $s^0_{pq}$ equal $u_{xp} \cdot u_{xq}$; creating (½)n(n+1) data sets, wherein the elements of the first data set are $s^0_{11}$ pertaining to each point, the elements of the second data set are $s^0_{12}$ and so on; and filtering each of these data sets by convolution with a suitable kernel to obtain the elements $s_{pq}$ of the n×n structural matrix S; and (d) calculating for each point $\epsilon = \text{trace}(S^0 S)/(\text{trace}(S^0) \cdot \text{trace}(S))$ and attributing the calculated value of $\epsilon$ to each point to obtain an image in which faults are highlighted.

Alternatively, the method of processing an image comprises the steps of (a) obtaining an n-dimensional initial image data set, wherein each element u(m=0) of the data set is the initial image intensity of a point of the image, and wherein n=2 or n=3;

(b) calculating for each point the partial derivatives of u(m) in n directions to obtain n derivative data sets of the partial derivatives $u_{xi}$;

(c) filtering for each point the partial derivatives $u_{xi}$ by convolution with a suitable kernel to obtain regularized partial derivatives $u^r_{xi}$; calculating for each point a symmetric n×n structural precursor matrix $S^0$, wherein the elements $s^0_{pq}$ equal $u^r_{xp} \cdot u^r_{xq}$; creating (½)n(n+1) data sets, wherein the elements of the first data set are $s^0_{11}$ pertaining to each point, the elements of the second data set are $s^0_{12}$ and so on; and filtering each of these data sets by convolution with a suitable kernel to obtain the elements $s_{pq}$ of the n×n structural matrix S;

(d) calculating for each point $\epsilon = \text{trace}(S^0 S)/(\text{trace}(S^0) \cdot \text{trace}(S))$ and attributing the calculated value of $\epsilon$ to each point to obtain an image in which faults are highlighted.

In the paper 'Coherence-Enhancing Diffusion Filtering' by J Weickert, International Journal of Computer Vision vol 31(2/3), pages 111–127, (1999), modifications of the method known from the abovementioned thesis are discussed. The paper discloses a method for enhancing coherence in images with flow-like structures. This method is not a method for preserving edges, and no parameter corresponding to the parameter $\epsilon$ of the present invention is disclosed.

BRIEF DESCRIPTION OF THE DRAWINGS

A better understanding of the invention may be had in the Detailed Description of the Preferred Embodiment, viewed in conjunction with the drawings of which.

DETAILED DESCRIPTION OF THE PREFERRED EMBODIMENT

Figure 1:
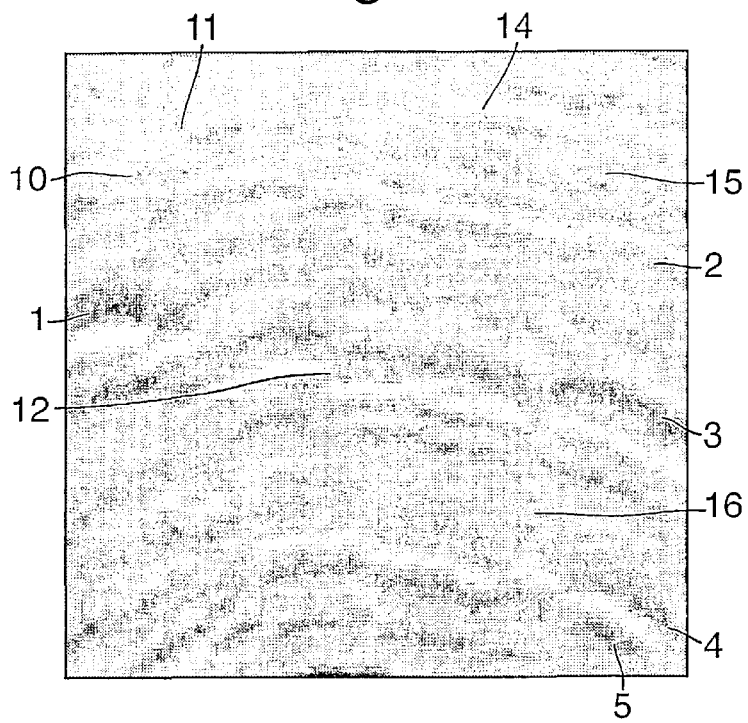
FIG. 1 is an exemplary image set.

The present invention will now be described by way of example in more details. At first the equations for a two-dimensional image are discussed, then for a three dimensional image and thereafter alternative embodiments.

In two dimensions, the initial image data set comprises $k_1 \times k_2$ elements (or points) u(m=0), wherein the value of each element u is the initial image intensity of a point of the image, and wherein $k_1$ and $k_2$ are the number of points in the two directions $x_1$ and $x_2$ of the two-dimensional image. The word pixel is used to refer to such a point in two dimensions, and in three dimensions, the point is called a voxel.

The next step comprises calculating the partial derivatives of all points u(m) in n directions to obtain n derivative data sets of the partial derivatives $u_{xi}$. The first data set comprises $k_1 \times k_2$ values of $u_{x1}$ (=$\partial u/\partial x_1$) and the second data set comprises $k_1 \times k_2$ values of $u_{x2}$ (=$\partial u/\partial x_2$).

Then for each point a symmetric n×n structural matrix S is calculated, wherein the elements $s_{pq}$ equal $u_{xp} \cdot u_{xq}$. The structural matrix S is in two dimensions $$\begin{pmatrix} u_{x1} \cdot u_{x1} & u_{x1} \cdot u_{x2} \\ u_{x2} \cdot u_{x1} & u_{x2} \cdot u_{x2} \end{pmatrix}.$$

Then for each point an n×n diffusion matrix D is calculated, wherein the elements $d_{ij}$ are a function of the elements $s_{pq}$, which elements $s_{pq}$ are a function of the partial derivatives $u_{xp}$ and $u_{xq}$.

Then the image comprising the elements u(m=0) is processed in M steps to obtain a processed image comprising elements u(m=M), wherein after each step the integer m is increased with 1. The $k_1 \times k_2$ values u(m+1) of each image are obtained from the values u(m) from a previous image by solving a diffusion type equation: u(m+1)=u(m)+c.div ($\epsilon$.Dgrad(u(m))). The number of times the image is processed, M, is a predetermined value. In order to remove noise, M is suitably in the range of from 2 to 4, and when in addition thereto the image has to be simplified, M is suitably in the range of from 5 to 20.

In this equation, c is a predetermined constant, $0 \leq c \leq 1$, and $\epsilon$ is a scalar, $0 \leq \epsilon \leq 1$, wherein $\epsilon$ is close to zero when near an edge and close to 1 when far away from an edge. The scalar $\epsilon$ can be understood to be a fault highlighter.

In two dimensions, $$div(\varepsilon \cdot Dgrad(u)) = \sum_{i=1}^{2} \frac{\partial}{\partial x_i}(\varepsilon(d_{i1}u_{x1} + d_{i2}u_{x2})).$$

In three dimensions, the image data set comprises $k_1 \times k_2 \times k_3$ image intensities $u(m)$. The first derivative data set comprises $k_1 \times k_2 \times k_3$ values of $u_{x1}$ ($=\partial u/\partial x_1$), the second derivative data set comprises $k_1 \times k_2 \times k_3$ values of $u_{x2}$ ($=\partial u/\partial x_2$), and the third derivative data set comprises $k_1 \times k_2 \times k_3$ values of $u_{x3}$ ($=\partial u/\partial x_3$). The n×n structural matrix S is $$\begin{pmatrix} u_{x1} \cdot u_{x1} & u_{x1} \cdot u_{x2} & u_{x1} \cdot u_{x3} \\ u_{x2} \cdot u_{x1} & u_{x2} \cdot u_{x2} & u_{x2} \cdot u_{x3} \\ u_{x3} \cdot u_{x1} & u_{x3} \cdot u_{x2} & u_{x3} \cdot u_{x3} \end{pmatrix}.$$

In three dimensions, $$div(\varepsilon \cdot Dgrad(u)) = \sum_{i=1}^{3} \frac{\partial}{\partial x_i}(\varepsilon(d_{i1}u_{x1} + d_{i2}u_{x2} + d_{i3}u_{x3})).$$

In the above, the diffusion matrix is not calculated directly from the image intensities. However, suitably the diffusion matrix is calculated from filtered data. Therefore the step of calculating the structural matrix suitably comprises calculating for each point a symmetric n×n structural precursor matrix $S^0$, wherein the elements $s^0_{pq}$ equal $u_{xp} \cdot u_{xq}$; creating $(\frac{1}{2})n(n+1)$ data sets, wherein the elements of the first data set are $s^0_{11}$ pertaining to each point, the elements of the second data set are $s^0_{12}$ and so on; and filtering each of these data sets by convolution with a suitable kernel to obtain the elements $s_{pq}$ of the n×n structural matrix S.

In an alternative embodiment, the n×n structural matrix S is calculated from filtered partial derivatives. To this end, the partial derivatives $u_{xi}$ are filtered for each point by convolution with a suitable kernel to obtain regularized partial derivatives $u^r_{xi}$. For each point a symmetric n×n structural precursor matrix $S^0$ is calculated, wherein the elements $s^0_{pq}$ equal $u^r_{xp} \cdot u^r_{xq}$. Then the $(\frac{1}{2})n(n+1)$ data sets are created, wherein the elements of the first data set are $s^0_{11}$ pertaining to each point, the elements of the second data set are $s^0_{12}$ and so on. And these data sets are filtered by convolution with a suitable kernel to obtain the elements $s_{pq}$ of the n×n structural matrix S.

Suitably the edge preservation parameter $\epsilon$ is derived from the image data set by calculations. Applicant had found that the structural precursor matrix $S^0$ can be used to estimate the scalar $\epsilon$, suitably $\epsilon = \text{trace}(S^0S)/(\text{trace}(S^0) \cdot \text{trace}(S))$, wherein $\text{trace}(A)$ is the sum of the diagonal elements $a_{kk}$ of the matrix A. In this way $\epsilon$ becomes a function of the partial derivatives of $u(m)$ in the two or three directions. And the scalar $\epsilon$ is a fault highlighter that is calculated for each point. The scalar is about 1 in the absence of a fault and much smaller than 1 in the presence of a fault.

Suitably step (d) comprises determining the n eigenvalues $\lambda_i$ and n eigenvectors $v_i$ of each of the structural matrices S; sorting the eigenvalues so that $\lambda_1 \geq \lambda_2 (\geq \lambda_3)$ and calculating for each point an n×n diffusion matrix D, wherein the elements $d_{pq}$ equal $v_{2p} \cdot v_{2q}$ (wherein $v_2$ is the eigenvector pertaining to the smallest eigenvalue if n=2) or wherein the elements $d_{pq}$ equal $v_{2p} \cdot v_{2q} + v_{3p} \cdot v_{3q}$ (wherein $v_2$ and $v_3$ are the eigenvectors pertaining to the smallest eigenvalues if n=3). The symbols $v_{ip}$ and $v_{iq}$ denote the p-th and q-th element of the eigenvector $v_i$. As a result the eigenvector pertaining to the largest eigenvalue does not contribute to the diffusion matrix, and the eigenvector(s) pertaining to the smaller eigenvalue(s) do contribute. This inhibits diffusion of the image luminance in the direction of the eigenvector pertaining to the largest eigenvalue, which latter eigenvector is directed perpendicular to the reflection.

The suitable kernel is a kernel for low pass filtering, such a kernel is symmetric and positive everywhere. A suitable kernel is the Gaussian kernel of width $\sigma > 0$, which is given by the following equation: The Gaussian kernel is used as a $$K_\sigma(x) = \frac{1}{(2\pi\sigma^2)^{n/2}} \cdot \exp\left(\frac{-\|x\|^2}{2\sigma^2}\right)$$

convolution mask, wherein x is the position of the centre of the convolution mask and $\|\cdot\|$ is the Euclidean norm, and n is the dimension.

Reference is made to FIG. 1, which shows the original image. The image is 128 pixels by 128 pixels having a value in the range from 0 to 255. The picture shows reflectors 1, 2, 3, 4 and 5 and faults 10, 11, 12, 14 and 15. For the sake of clarity, not all reflectors and faults have been referred to with a reference numeral.

Figure 2:
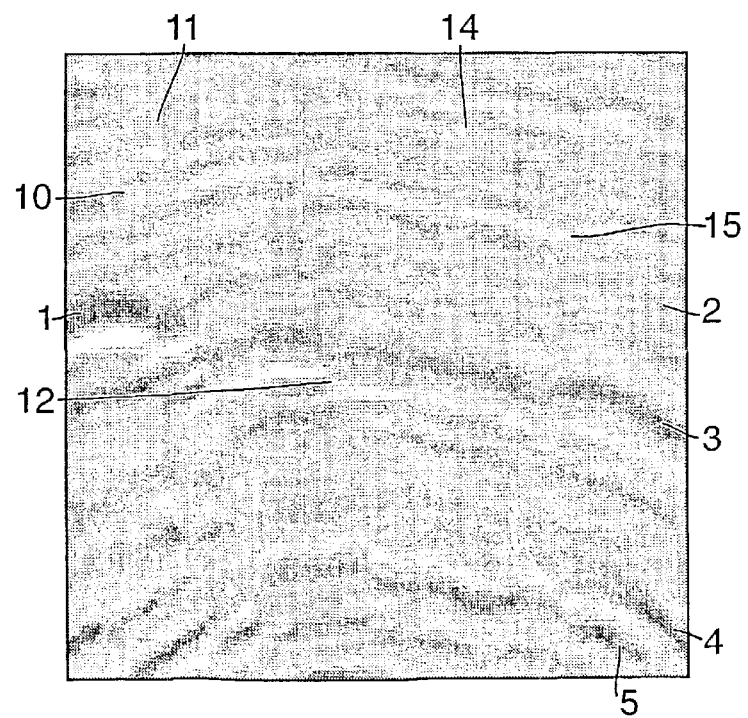
FIG. 2 is the exemplary image set processed with three anisotropic diffusion steps according to the method of the present invention.
Figure 3:
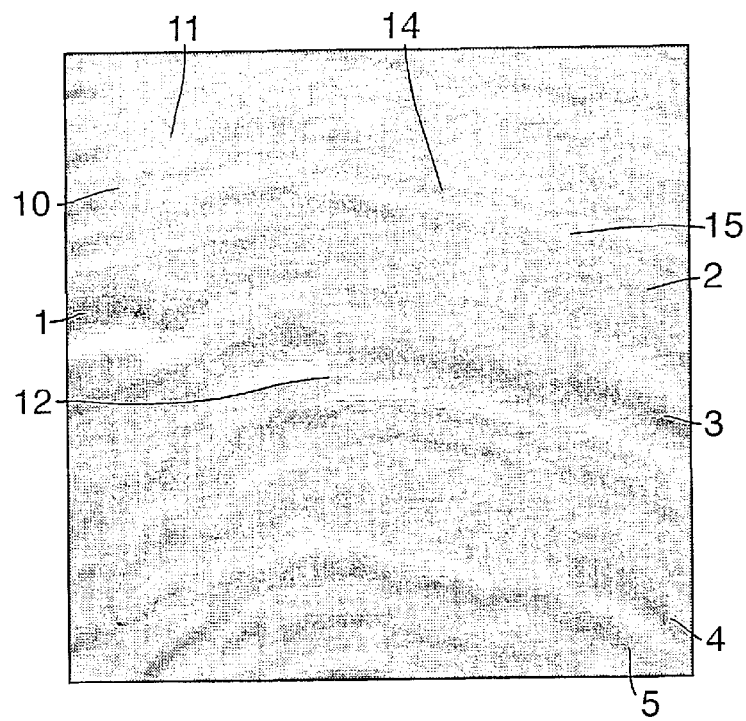
FIG. 3 is the image set treated with ten anisotropic diffusion steps according to the method of the present invention.

FIGS. 2 and 3 show the original image treated according to the present invention. The structural tensor had been calculated as follows, at first for each point the partial derivatives $u_{xi}$ were filtered by convolution with a Gaussian kernel to obtain regularized partial derivatives $u^r_{xi}$; then for each point a symmetric n×n structural precursor matrix $S^0$ was calculated, wherein the elements $s^0_{pq}$ equal $u^r_{xp} \cdot u^r_{xq}$; creating $(\frac{1}{2})n(n+1)$ data sets, wherein the elements of the first data set are $s^0_{11}$ pertaining to each point, the elements of the second data set are $s^0_{12}$ and so on. To obtain the elements $s_{pq}$ of the n×n structural matrix S each of these data sets is filtered by convolution with a Gaussian kernel.

In order to get FIG. 2, three anisotropic diffusion steps were applied. The edges are made clearer whilst noise is reduced.

FIG. 3 shows a smoother picture, with less noise, obtained with the method according to the present invention after ten anisotropic diffusion steps.

Figure 4:
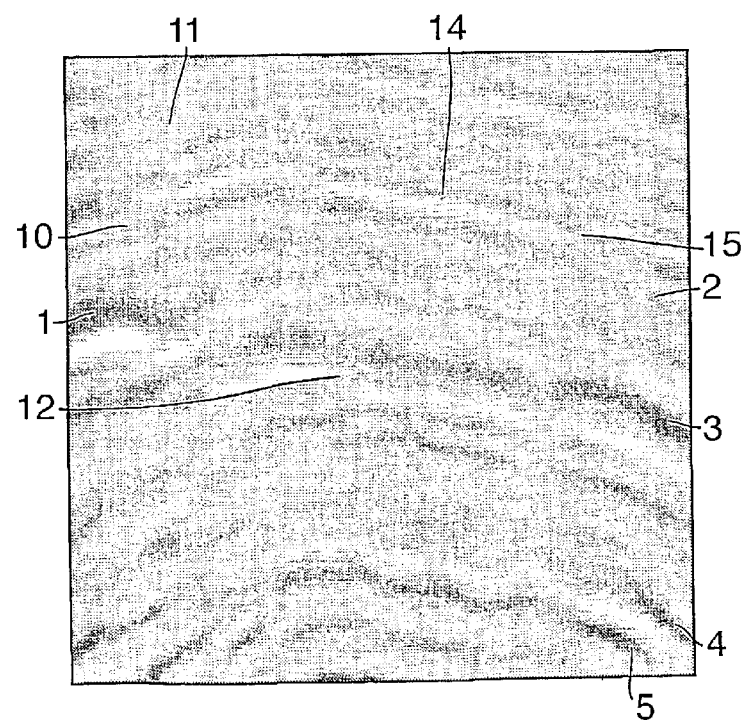
FIG. 4 is the image set treated with three anisotropic diffusion steps with no edge preservation.

In order to show the improvement obtained with the method according to the present invention, reference is made to FIGS. 4–7, which have been obtained with known methods. FIG. 4 shows the image treated not according to the present invention with three anisotropic diffusion steps with no edge preservation, in which $\epsilon = 1$.

Figure 5:
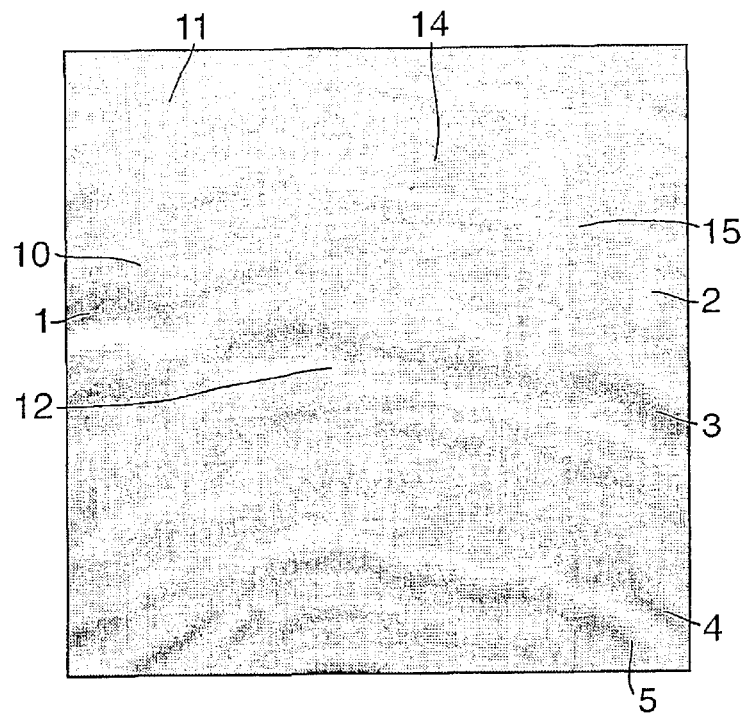
FIG. 5 is the image set treated with ten anisotropic diffusion steps with no edge preservation.

FIG. 5 shows the image treated not according to the present invention with ten anisotropic diffusion steps with no edge preservation, $\epsilon = 1$.

Figure 6:
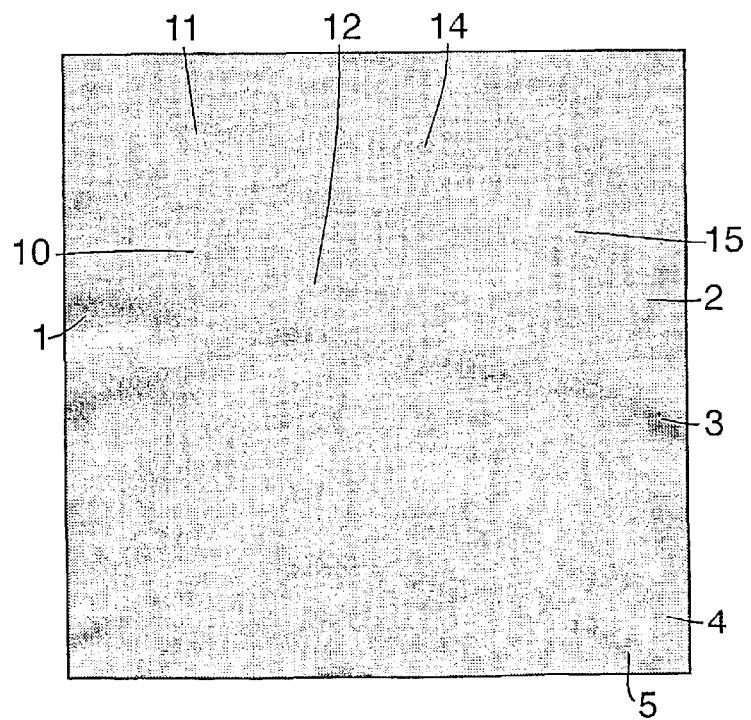
FIG. 6 is the image set treated with anisotropic diffusion without edge preservation.
Figure 7:
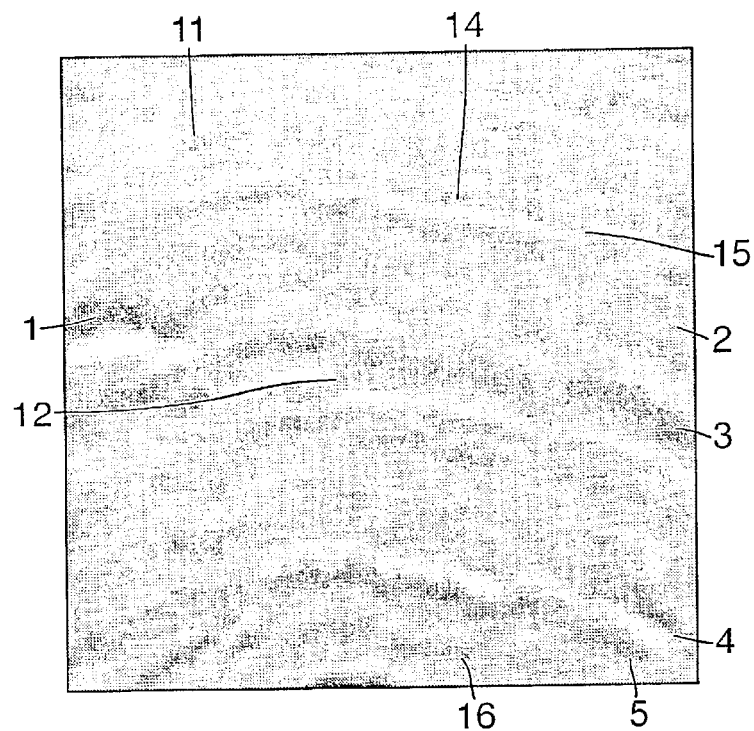
FIG. 7 is the image set treated with anisotropic diffusion with edge preservation according to Perona-Malik with $\lambda=10$.

FIG. 6 shows the image treated not according to the invention with isotropic diffusion without edge preservation; and FIG. 7 shows the image treated not according to the invention with isotropic diffusion with edge preservation according to Perona-Malik with $\lambda = 10$.

Figure 8:
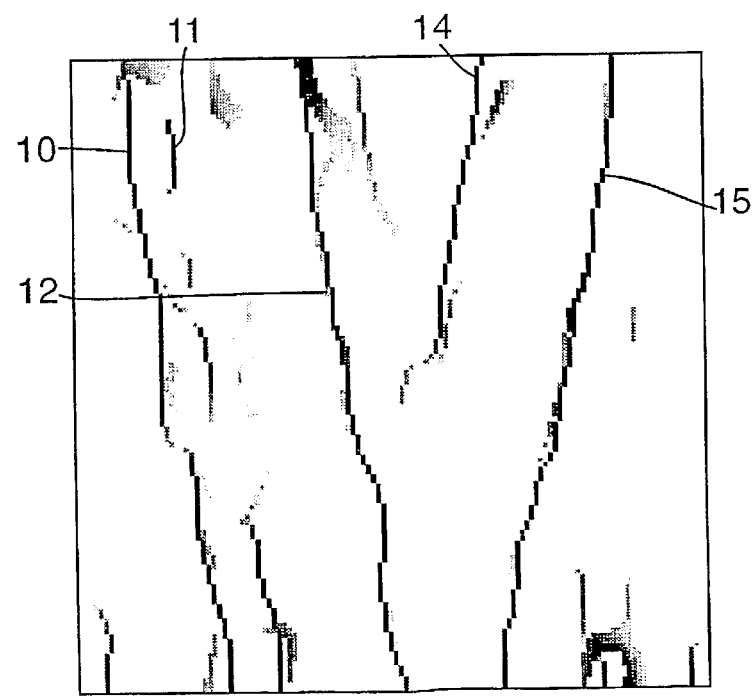
FIG. 8 is the original image set treated to highlight faults.

FIG. 8 shows an image obtained from FIG. 1 processed to highlight the faults. The method of processing the image comprised calculating for each point of the original image (FIG. 1) the partial derivatives of $u(m)$ in n directions to obtain n derivative data sets of the partial derivatives $u_{xi}$; filtering for each point the partial derivatives $u_{xi}$ by convolution with a suitable kernel to obtain regularized partial derivatives $u^r_{xi}$; calculating for each point a symmetric n×n structural precursor matrix $S^0$, wherein the elements $s^0_{pq}$ equal $u^r_{xp} \cdot u^r_{xq}$; creating $(\frac{1}{2})n(n+1)$ data sets, wherein the elements of the first data set are $s^0_{11}$ pertaining to each point, the elements of the second data set are $s^o_{12}$ and so on; and filtering each of these data sets by convolution with a suitable kernel to obtain the elements $s_{pq}$ of the n×n structural matrix S. Then for each point $\epsilon=\text{trace}(S^oS)/(\text{trace}(S^o)\cdot\text{trace}(S))$ was calculated, and the value of $\epsilon$ was attributed to each point to obtain FIG. 8 in which faults are highlighted in black.

What is claimed is:

1. A method of processing an image the steps comprising:
   (a) obtaining an n-dimensional initial image data set, wherein each element u(m=0) of the data set is the initial image intensity of a point of the image, and wherein n=2 or n=3;
   (b) calculating for each point the partial derivatives of u(m) in n directions to obtain n derivative data sets of the partial derivatives $u_{xi}$;
   (c) calculating for each point a symmetric n×n structural matrix S, wherein the elements $s_{pq}$ equal $u_{xp} \cdot u_{xq}$;
   (d) calculating for each point an n×n diffusion matrix D, wherein the elements $d_{ij}$ are a function of the elements $s_{pq}$;
   (e) calculating for each point u(m+1) from u(m) using the following equation u(m+1)=u(m)+c.div($\epsilon$.Dgrad(u(m))), wherein c is a predetermined constant, $0 \leq c \leq 1$, and wherein $\epsilon$ is a scalar, $0 \leq \epsilon \leq 1$, wherein $\epsilon$ is close to zero when near an edge and close to 1 when far away from an edge; and
   (f) repeating steps (b) through (e) M times to obtain the processed image.

2. The method according to claim 1, wherein step (c) comprises calculating for each point a symmetric n×n structural precursor matrix $S^o$, wherein the elements $s^o pq$ equal $u_{xp} \cdot u_{xq}$; creating (½) n (n+1) data sets, wherein the elements of the first data set are $s^o_{11}$ pertaining to each point, the elements of the second data set are $s^o_{12}$ and so on; and filtering each of these data sets by convolution with a suitable kernel to obtain the elements $s_{pq}$ of the n×n structural matrix S.

3. The method according to claim 1, wherein step (c) comprises filtering for each point the parties derivatives $u_{xi}$ by convolution with a suitable kernel to obtain regularized partial derivatives $u^r_{xi}$; calculating for each point a symmetric n×n structural precursor matrix $S^o$, wherein the elements $s^o pq$ equal $u^r_{xp} \cdot u^r_{xq}$; creating (½) n (n+1) data sets, wherein the elements of the first data set are $s^o_{11}$ pertaining to each point, the elements of the second data set are $S^o_{12}$ and so on; and filtering each of these data sets by convolution with a suitable kernel to obtain the elements $s_{pq}$ of the n×n structural matrix S.

4. The method according to claim 2, wherein $\epsilon=\text{trace}(S^oS)/(\text{trace}(S^o)\cdot\text{trace}(S))$.

5. The method according to claim 1, wherein step (d) comprises determining the n eigenvalues $\lambda_i$ and n eigenvectors $v_i$ of each of the n×n structural matrices S; sorting the eigenvalues so that $\lambda_1 \geq \lambda_2 (\geq \lambda_3)$ and calculating for each point an n×n diffusion matrix D, wherein the elements $d_{pq}$ equal $v_{2p} \cdot v_{2q}$ (if n=2) or wherein the elements $d_{pq}$ equal $v_{2p} \cdot v_{2q} + v_{3p} \cdot v_{3q}$ (if n=3).

6. A method of processing an image the steps comprising:
   (a) obtaining an n-dimensional initial image data set, wherein each element u(m=0) of the data set is the initial image intensity of a point of the image, and wherein n=2 or n=3;
   (b) calculating for each point the partial derivatives of u(m) in n directions to obtain n derivative data sets of the partial derivatives $U_{xi}$;
   (c) calculating for each point a symmetric n×n structural matrix $S^o$, wherein the elements $s^o_{pq}$ equal $u_p \cdot u_q$; creating (½)n(n+1) data sets, wherein the elements of the first data set are $s^o_{11}$ pertaining to each point, the elements of the second data set are $s^o_{12}$ and so on; and filtering each of these data sets by convolution with a suitable kernel to obtain the elements $s_{pq}$ of the n×n structural matrix S; and
   (d) calculating for each point $\epsilon=\text{trace}(S^oS)/(\text{trace}(S^o)\cdot\text{trace}(S))$ and attributing the calculated value of $\epsilon$ to each point to obtain an image in which faults are highlighted.

7. A method of processing an image the steps comprising:
   (a) obtaining an n-dimensional initial image data set, wherein each element u(m=0) of the data set is the initial image intensity of a point of the image, and wherein n=2 or n=3;
   (b) calculating for each point the partial derivatives of u(m) in n directions to obtain n derivative data sets of the partial derivatives $u_{xi}$;
   (c) filtering for each point the partial derivatives $u_{xi}$ by convolution with a suitable kernel to obtain regularized partial derivatives $u^r_{xi}$; calculating for each point a symmetric n×n structural precursor matrix $S^o$, wherein the elements $s^o_{pq}$ equal $u^r_{xp} \cdot u^r_{xq}$; or creating (½)n(n+1) data sets, wherein the elements of the first data set are $S^o_{11}$ pertaining to each point, the elements of the second data set are $s^o_{12}$ and so on; and filtering each of these data sets by convolution with a suitable kernel to obtain the elements $s_{pq}$ of the n×n structural matrix S; and
   (d) calculating for each point $\epsilon=\text{trace}(S^oS)/(\text{trace}(S^o)\cdot\text{trace}(S))$ and attributing the calculated value of $\epsilon$ to each point to obtain an image in which faults are highlighted.

* * * * *